United States Patent [19]

Messman

[11] Patent Number: 5,276,604
[45] Date of Patent: Jan. 4, 1994

[54] HIGH VOLTAGE REGULATOR FOR AN INTEGRATED HORIZONTAL SWEEP SYSTEM

[75] Inventor: Bruce E. Messman, Lake In the Hills, Ill.

[73] Assignee: Zenith Electronics Corporation, Glenview, Ill.

[21] Appl. No.: 19,518

[22] Filed: Feb. 19, 1993

Related U.S. Application Data

[63] Continuation of Ser. No. 744,773, Aug. 14, 1991, Pat. No. 5,189,599.

[51] Int. Cl.$^5$ .......................................... H02M 3/335
[52] U.S. Cl. ........................................ 363/65; 363/21; 363/97; 315/411; 358/190
[58] Field of Search .................. 315/411; 358/190; 363/20, 210, 650, 71, 970, 131

[56] References Cited

U.S. PATENT DOCUMENTS

| | | | |
|---|---|---|---|
| 3,742,242 | 6/1973 | Murio et al. | 363/21 |
| 4,242,714 | 12/1980 | Yoshida et al. | 315/408 |
| 4,466,051 | 8/1984 | Fitzgerald | 363/21 |
| 4,524,411 | 6/1985 | Willis | 363/21 |
| 4,546,388 | 10/1985 | Williams | 358/190 |
| 4,546,421 | 10/1985 | Bello et al. | 363/97 |
| 4,614,899 | 9/1986 | Webb et al. | 315/411 |
| 4,728,868 | 3/1988 | Ishikawa et al. | 315/411 |
| 4,801,852 | 1/1989 | Kashiwagi | 315/411 |
| 4,808,906 | 2/1989 | Liepe | 358/190 |
| 4,956,587 | 9/1990 | Kitou | 315/411 |
| 5,019,754 | 5/1991 | Onozawa et al. | 315/408 |
| 5,021,719 | 6/1991 | Arai et al. | 315/364 |
| 5,049,792 | 9/1991 | Oh | 315/411 |
| 5,189,599 | 2/1993 | Messman | 363/21 |

Primary Examiner—Jeffrey L. Sterrett

[57] ABSTRACT

A voltage regulator for a flyback-type high voltage supply having: a pulse transformer with its secondary interconnected in series with the primary of a flyback transformer; a control circuit for sensing the generation of a flyback pulse, a reference voltage, and a feedback voltage signal appearing at the output of the flyback transformer; and a switch for selectively applying energy to the primary of the pulse transformer while uniformly maintaining the flow of current through the primary of the flyback transformer.

14 Claims, 4 Drawing Sheets

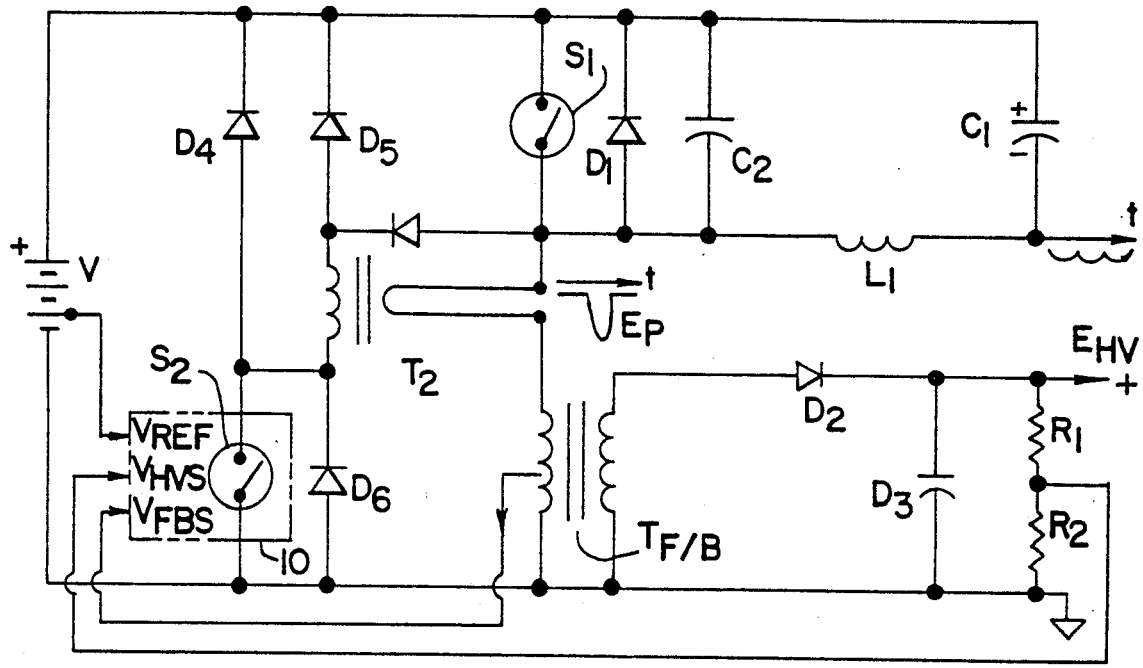
Fig. 1 (PRIOR ART)
Fig. 2 (PRIOR ART)
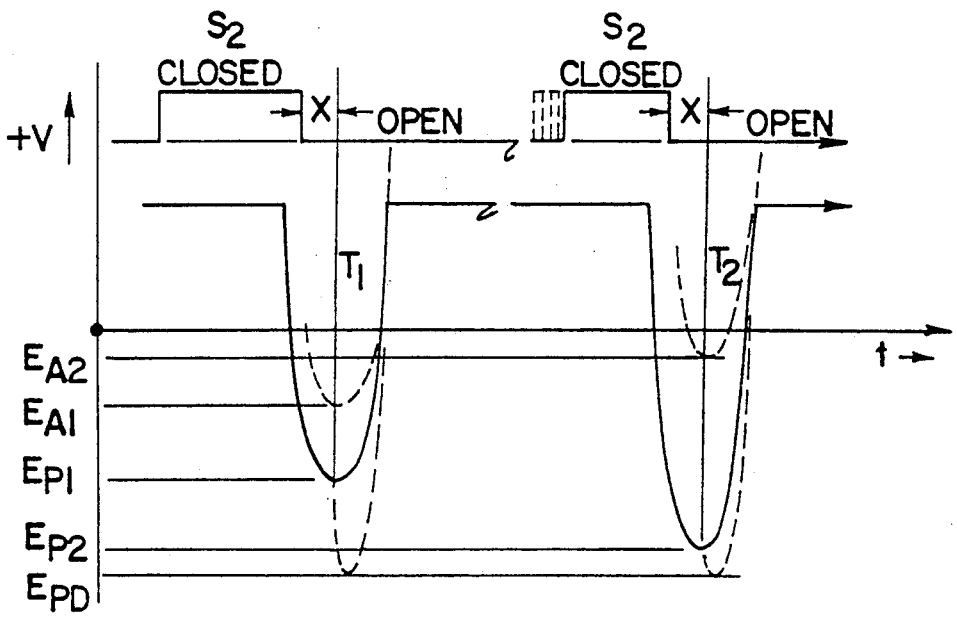

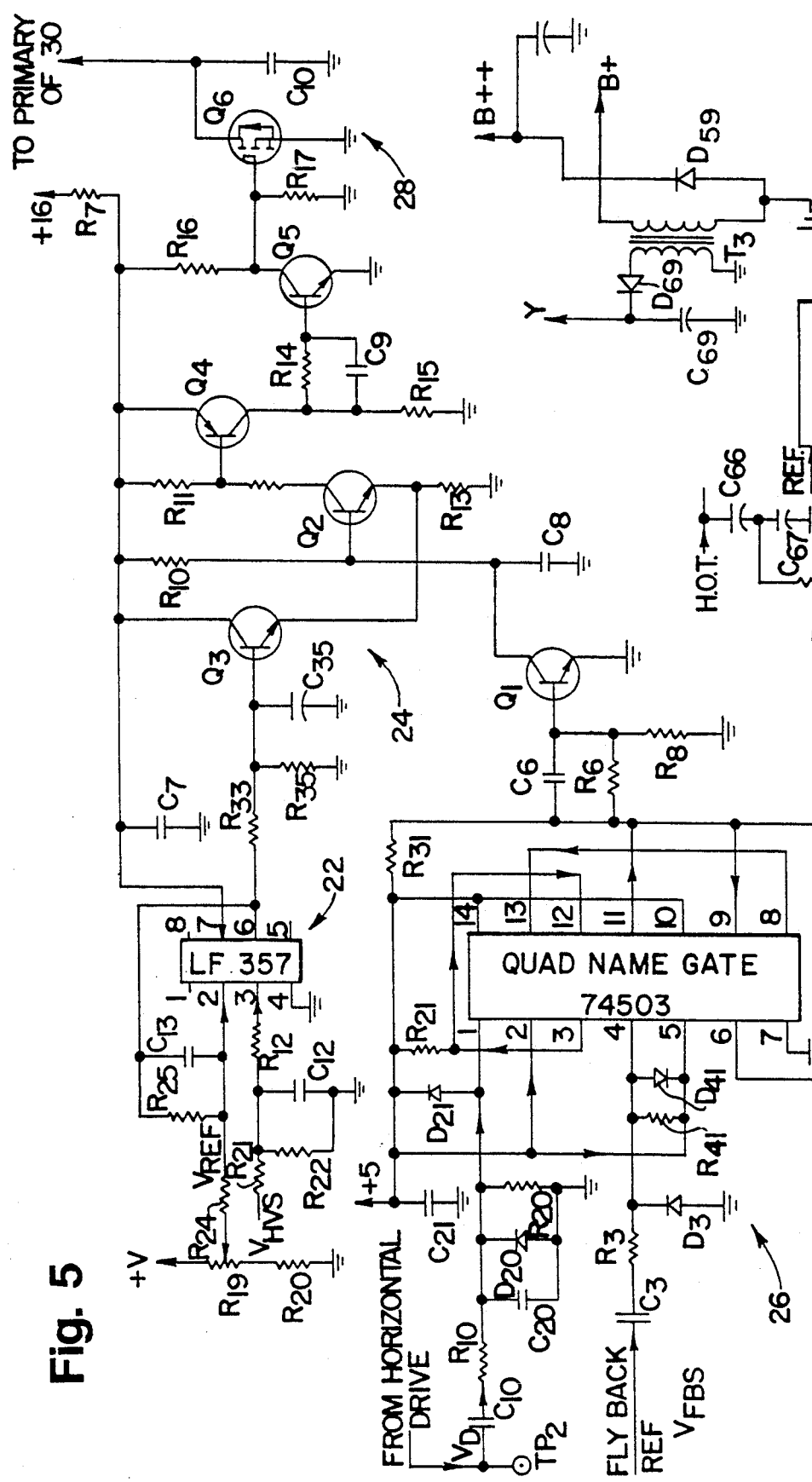
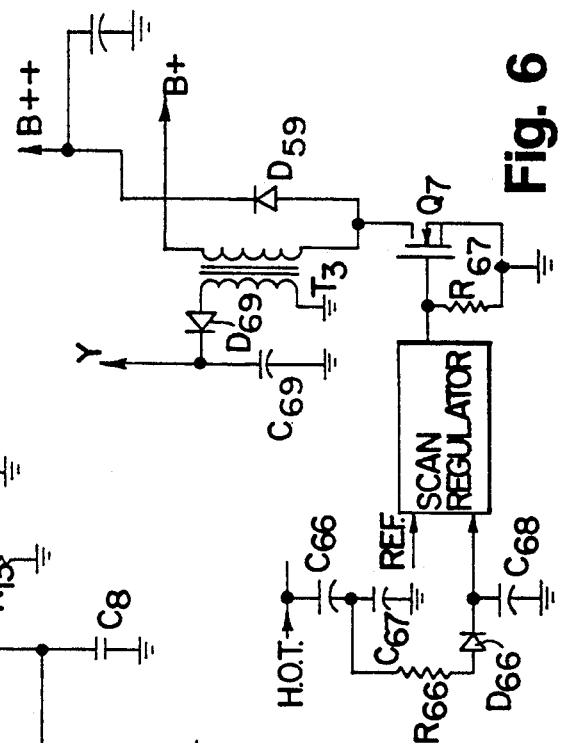
Fig. 5
Fig. 6

HIGH VOLTAGE REGULATOR FOR AN INTEGRATED HORIZONTAL SWEEP SYSTEM

This application is a continuation of application Ser. No. 744,773 filed Aug. 14, 1991, U.S. Pat. No. 5,189,599.

TECHNICAL FIELD

This invention relates to the general subject of voltage regulators for pulsed voltage power supplies and, in particular, to voltage regulators for flyback-type high voltage supplies adapted for use in cathode ray displays, video display terminals and computer monitors.

BACKGROUND OF THE INVENTION

Cathode ray tubes (CRTs) are the most widely used electrooptic image transducers ever devised. Their major usage began with the introduction of television news and entertainment broadcasting and has now spread into all systems of visual image presentation, information displays and computer data readout. Such displays are generated by rapid movement of an information modulated electron beam by means of magnetic fields introduced by coils mounted externally on the neck of the tube. An accelerating voltage of several thousand volts assures projection of the electron beam onto the phosphor coated screen with sufficient energy to cause it to write with a brilliant glow.

When such a beam is deflected according to an orderly procedure of movement (such a from left to right across the screen starting at the upper left and proceeding downward), a rectangular patch is recorded for the viewer's visual retention. When repeated often enough, the illusion of continued presence of such an image field is created. Variations in the intensity of the electron beam as it moves repeatedly through such a scanned raster register in the eye and mind of the viewer as recognizable geometric images.

It is common practice to move the electron beam across the screen at a uniform velocity both in the direction of the rapid line scan (generally horizontal) as well as in the slower (generally vertical) field scanning direction. Linearly variant current ramps are applied to the deflecting coils on the neck of the tube to accomplish this. Each current ramp terminates as the electron beam reaches its extreme position and then reverses direction quickly causing the beam to return to its starting point. In order to support the illusion of continued image presence without tell-tale flicker becoming apparent, it is necessary to refresh the entire image at least fifty or sixty times per second. When a fine structure of many hundred scanning lines are to be included in the display so as to provide good image resolution, the line scanning rate may need to be as high as one hundred thousand sweeps per second. It is standard practice to use only about sixteen thousand for broadcast television purposes. For computer driven monitors and displays (e.g., VGA, Super VGA, High Resolution, etc.), the scanning rate is even faster.

The cathode ray beam accelerating voltage (i.e., second anode voltage) often ranges from twelve to thirty kilovolts, depending upon screen size and the desired brightness level of the image generated. The current requirement imposed upon this high voltage source may range from fifty or one hundred microamps for monochrome screen to one or two milliamperes for color cathode ray tubes. The high voltage source itself can be any available type of power generator provided it can support the current demand of the CRT and has an upper current limit of a few milliamperes beyond which the voltage collapses so as to protect servicing personnel from instant electrocution should they make accidental contact therewith.

Early in the development of television broadcasting, a unique type of second anode voltage supply for magnetically deflected cathode ray tubes was developed. This very simple and inexpensive high voltage power supply system is a supplement to the magnetic beam deflection technique previously described and makes use of the rapid current reversal rapidly and repeatedly returns the electron beam to its start of sweep position. However when an electric current changes value rapidly while flowing in an inductor such as a deflecting coil, it creates a substantial voltage across the terminals of the coil by self induction. Thus, a brief voltage pulse, reaching several hundred volts in magnitude, is generated on the terminals of the deflection coil as it caused "flyback" of the CRT beam, line-by-line.

As a source of voltage, this "flyback" pulse found on the deflection coil terminals is powerful and can stand heavy loading due to the low internal impedance of the deflection coil system. It is only necessary therefore to "step up" this voltage by means of a transformer. The several hundred volt level of the deflection coil can thus be raised to the several thousand volt (rectified DC) level required to supply second anode voltage for the tube.

In this manner a low cost combination line deflection and high voltage generator has been developed for use with cathode ray tubes. The flyback high voltage system has reached almost universal acceptance in all forms of commercial cathode ray display devices in spite of one important limitation, a visible geometric expansion of the rawer area as screen brightness is increased. This defect is due to falling second anode voltage or poor high voltage regulation. Poor regulation (e.g., about 10 to 15 percent or less), although acceptable for an entertainment television display, is unacceptable for such critical display systems such as ultrasonic medical imagery, word processing business machines, computer aided design screens, and other systems which are sensitive to exactness of image size.

Poor voltage regulation in the flyback-type high voltage system just described is due to the inherently high internal source impedance of the step-up transformer and pulse rectifying arrangement. The system operates in a completely open loop manner, and generally lacks the benefit of any current preload. Many prior art attempts have been made to stabilize the voltage of such power supplies:

1. Using a high voltage shunt transistor (e.g., a Zener diode) to load the supply until an external load is applied, thereby holding a fixed threshold voltage level. This approach wastes power and heats up the thyristor which leads to early destruction.
2. Using a vacuum tube shunt regulator with or without voltage feedback loop control. This approach is also a power waster because the tube heater must also be activated; however, the components exhibit longer life.
3. Using an adjustable flyback interval under feedback loop control, having either inductive or capacitive tuning means, to control flyback voltage. Such a technique requires complex adjustment and the variable tuning is generally visible on the screen.

4. Using a separate flyback high voltage supply section independent of the deflection yoke section with an adjustable DC voltage source under feedback loop control. Although this is successful and is widely used, it is expensive and power inefficient due to near duplication of components.
5. Using a supplementary adjustable DC source added to the high voltage winding to offset internal drop as it occurs. This also requires a large number of additional components and power is inefficient.
6. Using a pulse width modulated feedback loop which supplies sufficient additional voltage, through an energy storage transformer, during the generation of each flyback pulse in order to maintain the high voltage output of the flyback transformer near a regulated level (e.g., U.S. Pat. No. 4,614,899 to Webb et. al.) Although voltage regulation is satisfactory, deflection yoke current is affected and image size is not exact.

Finally, while the above problem is characteristic of flyback-type high voltage power supplies, it is symptomatic of all pulsed voltage power supplies.

Thus, while there has been considerable progress in the design of voltage regulators for a flyback type high voltage power supply for a CRT, there are still some important shortcomings. In particular, while television displays operate under one standard frequency scanning rate, modern video monitors must be capable of operating in accordance with a plurality of video driving protocols (e.g., VGA etc.) In addition, even with voltage regulation, it is unacceptable for video displays to be affected by changes in current flow through its deflection yoke. An improved voltage regulator for a flyback-type voltage supply would be welcomed by users of video monitors, particularly those who demand exactness in image size.

SUMMARY OF THE INVENTION

A general object of the invention is to provide a high voltage regulation circuit for a pulsed voltage power supply.

Another objective of the invention is to provide a high voltage regulation circuit for a flyback-type voltage supply.

Still another object of the invention is to provide a high voltage regulator for a CRT display while maintaining a more uniform flow of current through the deflection yoke.

One specific object of the invention is to provide a voltage regulation circuit for a multi-frequency video display.

Yet another object of the invention is to provide a voltage regulator for a pulsed voltage power supply, wherein the additional energy applied to the primary of a flyback transformer is generally the same.

In accordance with the present invention, a voltage regulator is provided for a pulsed voltage power supply which generates voltage pulses to produce an unregulated output voltage. The voltage regulator comprises: first producing means, connected to the output of said power supply, for producing voltage feedback signals which are proportional to the magnitude of said output voltage; second producing means, receptive to said voltage pulses, for producing timing signals corresponding to the time for generation of each said voltage pulses; third producing means for producing a reference voltage; and constant energy applying means, receptive of said voltage feedback signals from said first producing means, said timing signals from said second producing means and said reference voltage from said third producing means, for applying sufficient additional voltage during said time for generation of each of said voltage pulses in order to maintain said voltage feedback signals substantially equal to said reference voltage, to maintain the combination of said additional voltage and said voltage pulses near a regulated level, and to uniformly maintain the current flow through said deflection yoke.

In one embodiment of the invention current through a deflection yoke is uniformly maintained and the high voltage output is kept near a regulated level by means of a modulation circuit which supplies an additional voltage pulse to each flyback pulse; in particular, the additional voltage pulse begins at a predetermined time before the time for generation of the flyback pulse, ends during the generation of the flyback pulse, and ends later in time when there is a greater difference between the reference voltage and the feedback voltage.

In one embodiment of the invention, the modulation circuit is controlled by a gating circuit which receives timing signals from the flyback transformer and timing signals from the driver of the deflection yoke circuit, whereby the voltage regulator is capable of operating at a plurality of horizontal scanning frequencies.

Numerous other advantages and features of the present invention will become readily apparent from the following detailed description of the invention, the embodiments described therein, from the claims, and from the accompanying drawings.

BRIEF DESCRIPTION OF THE DRAWINGS

FIG. 1 is a schematic diagram of a prior art flyback-type voltage power supply;

FIG. 2 is a graph showing the application of additional voltage to the primary of the flyback transformer of FIG. 1;

FIG. 5 is a detailed, partial schematic diagram of one practical embodiment of the circuit of FIG. 3; and FIG. 6 is a schematic diagram of two voltage supplies shown in FIG. 3.

DETAILED DESCRIPTION

Figure 3:
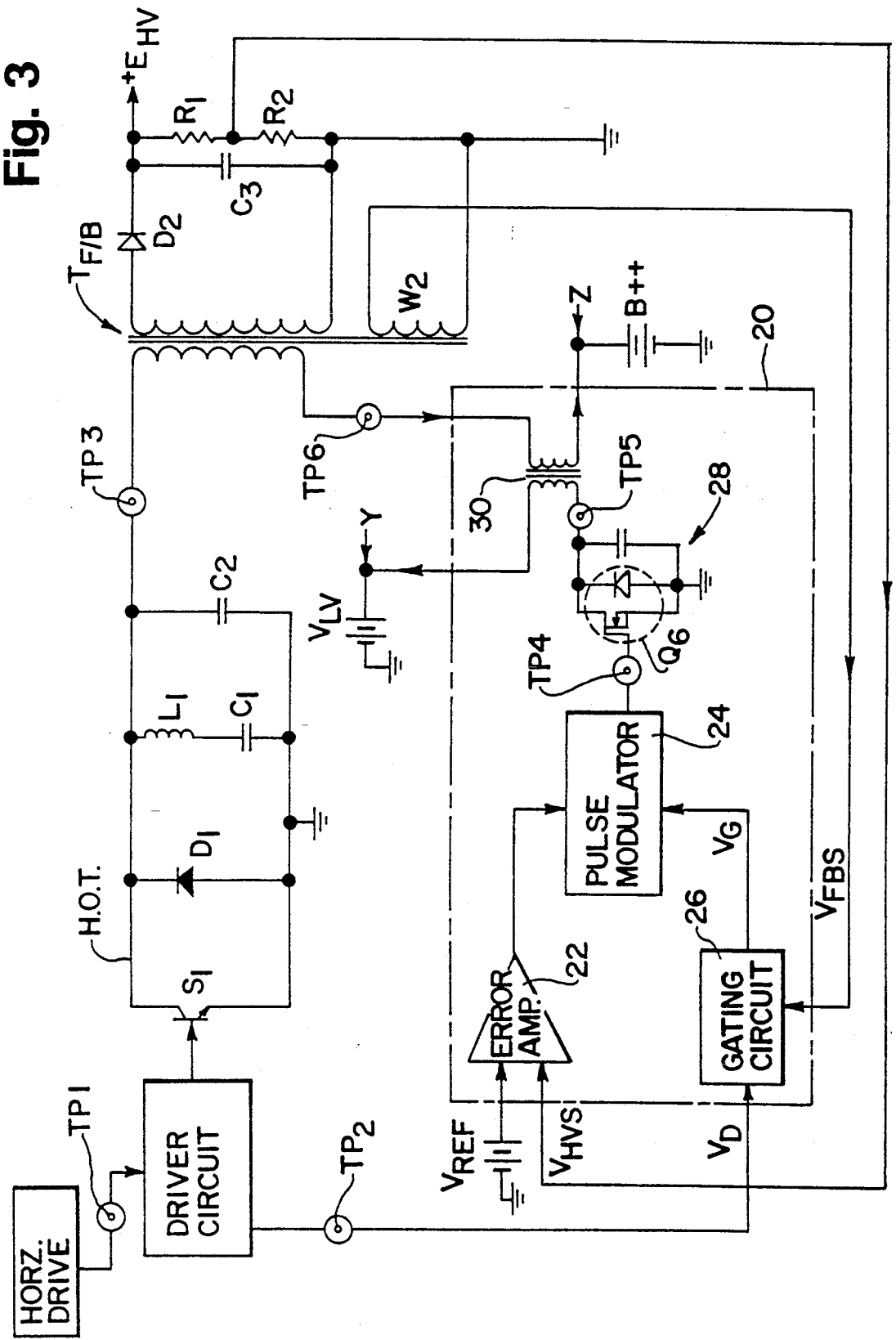
FIG. 3 is a schematic diagram of the voltage regulation circuit of the present invention.

While this invention is susceptible of embodiment in many different forms, there is shown in the drawings, and will herein be described in detail, one specific embodiment of the invention. It should be understood, however, that the present disclosure is to be considered an exemplification of the principles of the invention and is not intended to limit the invention to the specific embodiment illustrated.

Before describing the present invention, a basic prior art voltage regulator circuit for a flyback-type high voltage power supply will be described in order to highlight the shortcoming of the prior art and the advantages of the present invention.

Turning to FIG. 1, a main electronic switch $S_1$ is used to create an intermittent path for current between voltage source V and a deflection coil $L_1$. The main switch $S_1$ is closed for a little less than one half of each sweep cycle and switching cycles occur at the line sweep frequency, thus creating a current waveform which flows in the reflection yoke.

When the main switch $S_1$ is open, a path for current is provided to charge a large capacitor $C_1$ from a source V via to deflection yoke $L_1$ and the primary winding of the flyback transformer $T_{F/B}$. This capacitor $C_1$ is large and takes on a voltage charge equal to approximately V. This voltage is maintained by the capacitor $C_1$ since the capacitor alternately charges and discharges by equal currents in and out of the deflection yoke $L_1$ by action of the switch $S_1$.

Upon closure of the main switch $S_1$ the voltage on the capacitor $C_1$ is impressed upon deflection yoke $L_1$ and current flows through it. Upon opening the main switch $S_1$, the energy stored inductively on the deflection yoke finds a path into another capacitor $C_2$, which is conventionally called the "flyback tuning capacitor". At this time one undamped half-sinusoidal voltage pulse Ep (i.e., the basic flyback voltage pulse) is created, during the sweep cycle. The current reverses its direction of flow and now flows linearly outward from deflection yoke $L_1$ via a damper diode D and back into the large capacitor $C_1$. The size and shape of the basic flyback pulse Ep is determined by the inductance and capacitance values involved.

The voltage on the large capacitor $C_1$ changes slightly due to its having equal currents flowing into and out of it. Thus, the deflection yoke $L_1$ generates a linearly varying magnetic field which can deflect the CRT beam equally to either side of its freefall center position, as there is no net DC component of current in it.

The primary flyback voltage pulse Ep (see FIG. 2) will have a peak value from a few hundred volts to more than 1000 volts depending upon the sweep system design. The flyback transformer, $T_{F/B}$ is arranged to receive this flyback pulse Ep across its primary winding. The inductance of the primary winding is often chosen to be from five to ten times larger than the inductance of the deflection yoke $L_1$ to minimize interference with the operation of the deflection system. Furthermore, the flyback transformer, $T_{F/B}$ extracts only a relatively small fraction of the energy available in each primary flyback pulse Ep which it converts by turns ratio transformation into a much larger pulse. This latter secondary pulse is then rectified by a diode $D_2$ and filtered by a capacitor $C_3$ to become the desired second anode voltage $E_{HV}$ necessary to energize the cathode ray tube. In the absence of a voltage regulator, the magnitude of the secondary voltage pulse is unregulated and, therefore, the voltage at the output of the supply is unregulated.

Voltage regulation is one prior art device (i.e., U.S. Pat. No. 4,614,899 to Webb et al) is achieved by the addition of a supplementary energy storage transformer $T_2$, a steering diode $D_3$, voltage limiting diodes $D_4$, $D_5$ and $D_6$, an auxiliary switch S2, a Control Circuit 10 and a high voltage sampling resistor divider assembly $R_1$ and $R_2$.

The Control Circuit 10 receives line sweep timing information $V_{F/B}$ by means of a sample of the flyback pulse taken from a tap on the primary of the flyback transformer $T_{FB}$. It is also furnished with a fixed reference DC voltage $V_{REF}$, taken from tap on the voltage source V, is also provided to the Control Circuit 10.

The Control Circuit 10 serves to compare a high voltage sample $E_{HVS}$, which is fed back from the high voltage $E_{HV}$ at the output of the power supply via the resistor divider assembly $R_1$ and $R_2$, and the fixed reference voltage $V_{REF}$ so as to close and open the auxiliary switch S2 at appropriate times and thus achieve control of the D.C. high voltage $E_{HV}$.

The auxiliary switch S2 can be closed by the Control Ciroult 10 at any point in time during the sweep cycle (see FIG. 2). The main switch $S_1$, being closed during a large part of this period, provides a path for current from the voltage source V, via the steering diode $D_3$, into the primary of the energy storage transformer $T_2$. Upon closure of the auxiliary switch S2, a current begins to flow and to increase linearly toward some terminal value which it will have at the time the main sweep control switch $S_1$ is opened and the basic flyback pulse Ep is initiated. The energy stored in the transformer $T_2$ will be proportional to the product of its inductance value and the square of the peak current amplitude reached. Thus, the stored energy level in the energy storage transformer $T_2$ increases very rapidly as the auxiliary switch S2 is closed earlier in the sweep cycle. The auxiliary switch S2 opens at a time slightly later than the main switch $S_1$, thereby necessitating the sensing of the generation of the flyback pulse Ep as a timing signal $V_{FBS}$.

Whatever energy that may be present in storage transformer $T_2$ when the auxiliary switch S2 is opened, joins with the energy in the basic flyback pulse Ep to produce a combined flyback pulse having a larger voltage level, as shown in FIG. 2. In particular, energy $E_A$, from the energy storage transformer $T_2$ flowing through its secondary winding, is added as a voltage pulse directly to the basic flyback pulse Ep of the deflection coil system so as to supplement it in driving the primary of the high voltage transformer $T_{F/B}$. Thus, the final rectified D.C. voltage $E_{HV}$, from the secondary of the flyback transformer $T_{F/B}$ is placed directly under control of, or is a function of, the position in time at which the auxiliary switch S2 closed.

As shown in FIG. 2, a voltage pulse Ep, generated by the basic conventional circuit of FIG. 1 (or by any other pulsed voltage power supply), may be unregulated or variable over time in addition to varyinq with the load being driven. For example, during the time that a voltage pulse $E_{P1}$ is less than the voltage pulse $E_{P2}$ which occurs during time $T_2$ due to the unregulated nature of the power supply. Both voltage pulses $E_{P1}$ and $E_{P2}$, in this example, are less than the desired output pulse $E_{PD}$. The variation in output power occurs over the generation of many flyback pulses, therefore, the intervals $T_1$ and $T_2$ are shown separated in time.

In FIG. 2, an additive pulse $E_{P1}$ at one time $T_1$ is greater in magnitude than the magnitude of an additive pulse $E_{A2}$ at a later time $T_2$. To regulate the varying nature of the voltage pulse Ep and to achieve output regulation, the auxiliary switch S2 of the Control Circuit 10, is shut off in the sweep cycle to permit more energy to build up in the primary of the auxiliary transformer $T_2$ and to create a pulse $E_{A1}$. In particular, the auxiliary switch S2 is closed later in the sweep cycle to lessen the energy buildup to create pulse $E_{A2}$.

PRESENT INVENTION

The voltage control loop of the invention, shown in FIG. 3, comprises a voltage divider network $R_1$ and $R_2$, a winding $W_2$ on the secondary side of the flyback transformer $T_{F/B}$ a reference voltage source $V_{REF}$, and a Control Circuit 20.

The function of the Control Circuit 20 is to produce a small constant amplitude auxiliary flyback pulse $TP_6$ (approximately equal in pulse width to the system flyback pulse TP$_3$), TP$_3$ whose phase relationship with the system flyback pulse can be modulated. This pulse is injected into the low side of the primary winding of the flyback transformer T$_{F/B}$, by means of the pulse transformer 30, at the proper time to add or subtract the peak voltage across the primary winding of the flyback transformer. This voltage is transformed to the secondary of a flyback transformer T$_{F/B}$ where it becomes rectified in the usual manner by a secondary diode D$_2$ and internal and external capacitance C$_3$ to produce the CRT anode high voltage E$_{HV}$.

The Control Circuit 20 comprises an Error Amplifier 22, a Pulse Modulator 24, a Gating Circuit 26, and a Switch Network 28. The Switch Network 28 causes current from a low voltage source V$_{LV}$ to flow through the primary of the pulse transformer 30. The secondary of the pulse transformer 30 is in series with the primary of the flyback transformer T$_{F/B}$ and a Scan B-plus Voltage Supply B++. The Pulse Modulator 24 activates the Switch Network 28 in accordance with the output of the Gating Circuit 26 and the Error Amplifier 22.

In particular, the CRT anode high voltage E$_{HV}$ is fed back from the voltage divider network R$_1$ and R$_2$ to the Error Amplifier 22 where it produces an error voltage to change the relative phase of the injected flyback pulse (i.e., at TP$_6$) and thereby regulate the high voltage E$_{HV}$. Since the average DC voltage into the system is unchanged, the CRT anode high voltage can be modified independently of the horizontal scanning current through the deflection yoke L$_1$. Conversely, the Scan B-plus Voltage Supply B++ (about 60 to 120 VDC) can be altered to change scanning size or can be modulated for pin cushion correction independently of the high voltage output of the flyback transformer T$_{F/B}$.

The Gating Circuit 26 prevents the injected flyback pulse (at TP$_6$) from occurring before the system flyback pulse (at TP$_3$) which would otherwise occur primarily due to storage time delays of the horizontal output switch S$_1$. This is done by latching its output from a sample of the drive waveform from the horizontal output switch S$_1$ and unlatching it when a sample of the system flyback pulse V$_{FBS}$ occurs. Thus, the switches S$_1$ and Q$_6$ are caused to be 'closed' simultaneously, but the opening of the gating switch Q$_6$ is delayed until the occurrence of the sample flyback pulse V$_{FBS}$. Turn-off delays in the Switch Network 28 are very small so the system flyback pulse (at TP$_3$) and the injected flyback pulse (at TP$_6$) occur virtually simultaneously (i.e., zero phase shift). Since a Pulse Transformer 30 is phased to produce a negative voltage pulse (at TP$_6$), a maximum peak voltage is developed across the Flyback Transformer T$_{F/B}$ primary winding. This yields maximum voltage output at +E$_{HV}$.

The Pulse Modulator 24 receives the unmodulated square wave from the Gating Circuit 26 and then performs the function of variably shifting the time at which the gating switch Q$_6$ is turned off (i.e., falling edge P$_1$) thus shifting the phase of the injected flyback pulse from zero degrees (i.e., no phase shift, maximum +E$_{HV}$) to a maximum of 90 degrees (i.e., minimum +E$_{HV}$) relative to the system flyback pulse. The amount and direction of phase shift is controlled by the output of Error Amplifier 22 which regulates the output +E$_{HV}$ by comparing a sample of +E$_{HV}$ (i.e., E$_{HVS}$) via resistor divider network R$_1$ and R$_2$ to the voltage reference V$_{REF}$.

Figure 4A:
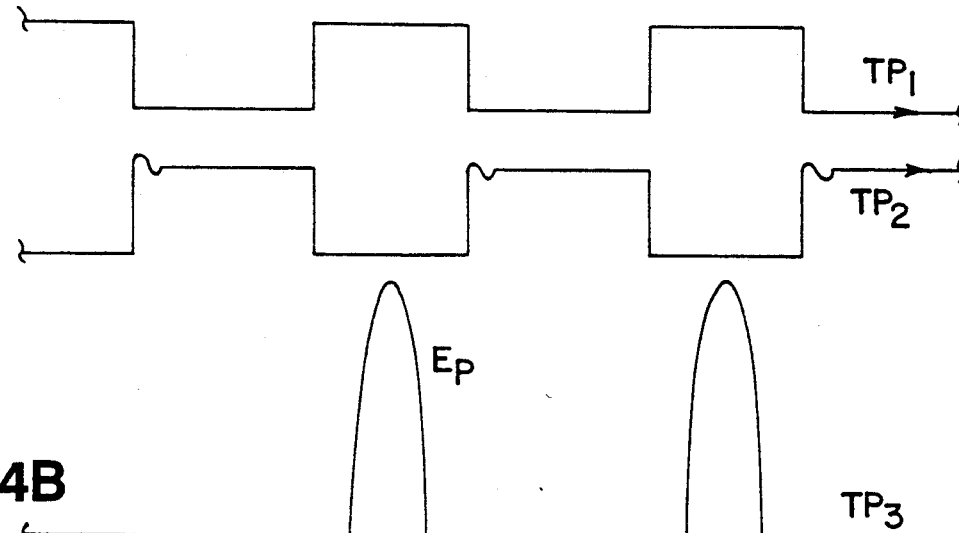
FIG. 4A through 4D depict the waveforms at selected portions of the circuit of FIG. 3.
Figure 4B:
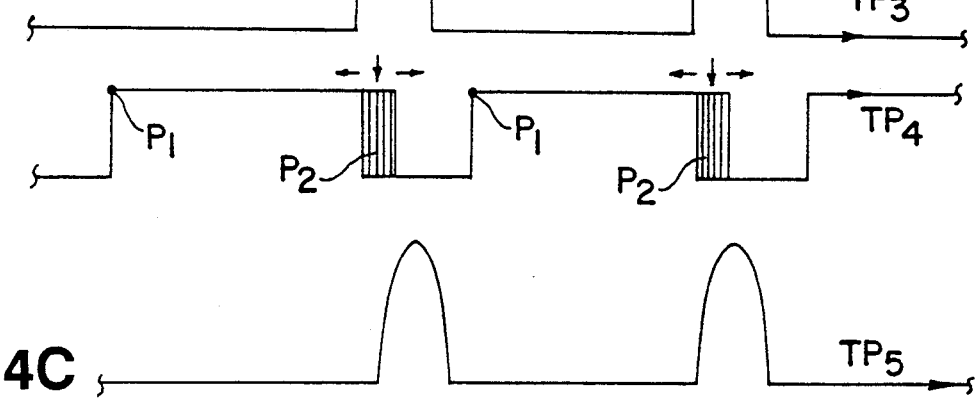
Figure 4C:
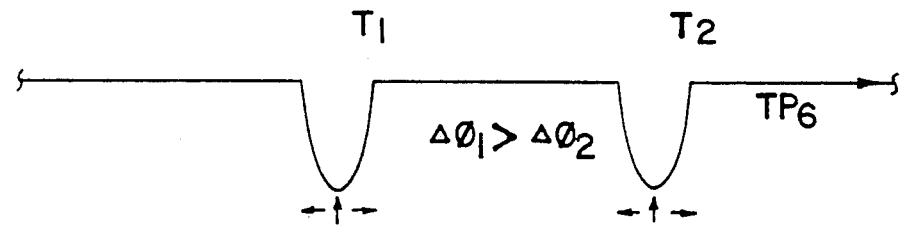
Figure 4D:
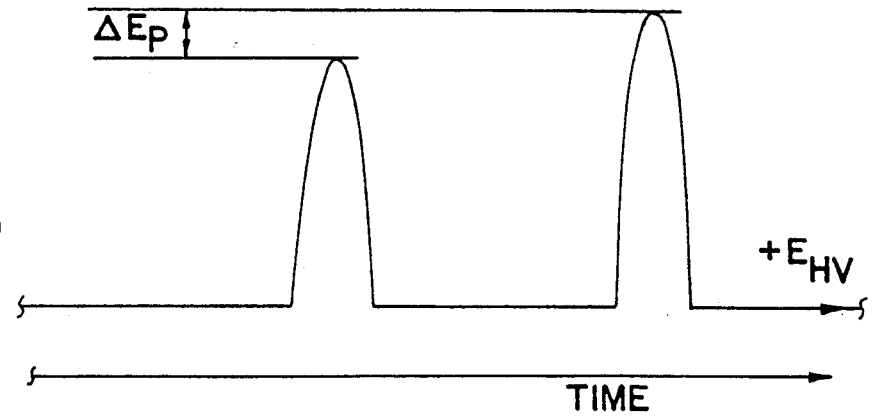

Those skilled in the art will recognize that by closing the Switching Network 28 at the same point P$_1$ in time relative to the system flyback pulse Ep (see FIG. 4B), the amount of energy extracted, or the current which flows through the yoke L$_1$ does not change from one sweep to the next. Moreover, since the point in time P$_2$ where the Pulse Modulator 24 opens the Switching Network 28 changes and since that point in time is during the flyback pulse, the operative effect is that of pulse position modulation or phase modulation rather than ordinary pulse width modulation.

The efficiency of the regulator that is the subject of the present invention is high, since it operates in a "switching" mode. High power linear components are not required.

In addition, the speed of regulator is inherently fast since the injected flyback pulse is always present and need only be modulated in time to alter the high voltage output E$_{HV}$. This design feature eliminates the problem of having to charge a large capacitor through a low source impedance (e.g., regulating by modulating the B+ supply into a filter/bypass capacitor).

In addition, the system is well suited for multi-frequency applications, since there isn't any large time constraint in the pulse circuit itself. For wide band multi-frequency applications, the low voltage supply V$_{LV}$ (e.g., about 16 to 32 VDC) to the primary of the pulse transformer 30 need only be connected to a tap in the scan system regulator (See FIG. 6) to change the applied voltage at the same ratio as the system voltage.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made, materials substituted and features of the invention may be modified. For example, to use the voltage regulator in a single frequency environment, the scan system regulator (See FIG. 6) can be omitted and the primary of the pulse transformer 30 can be connected to a low voltage supply which is not operated in response to the Scan B-plus voltage Supply B++. Thus, it will be appreciated that various modifications, alternatives, variations, etc., may be made without departing from the spirit and scope of the invention as defined in the appended claims. It is, of course, intended to cover by the appended claims all such modifications involved within the scope of the claims.

I claim:

1. A circuit for generating a regulated high voltage signal comprising:
    means responsive to a horizontal drive signal for generating a series of flyback voltage pulses;
    control means for generating a corresponding series of regulation voltage pulses each of which occurs in at least partial time coincidence with a respective one of said flyback voltage pulses;
    means for combining each of said regulation voltage pulses with the corresponding one of said flyback voltage pulses to produce a combined output signal; and
    means for generating a reference signal, said control means being responsive to said reference signal and said combined output signal for adjusting the position of each of said regulation voltage pulses relative to the corresponding flyback voltage pulse to regulate the level of said combined output signal.

2. The circuit of claim 1 wherein each of said voltage regulation pulses comprises a relatively constant energy pulse having substantially the same amplitude and pulse width.

3. The circuit of claim 1 wherein the leading edge of each of said regulation voltage pulses occurs in time coincidence with a respective one of said flyback voltage pulses.

4. The circuit of claim 1 wherein said control means comprises means for developing an error signal representing the difference between said combined output signal and said reference signal and means for adjusting the position of each of said regulation voltage pulses relative to the corresponding flyback voltage pulse for minimizing said error signal.

5. The circuit of claim 1 wherein said control means comprises means responsive to said horizontal drive signal for initiating the generation of a switching signal at a predetermined time prior to each of said flyback voltage pulses and terminating each of said switching signals during the respective flyback voltage pulse and means responsive to said switching signals for generating said regulation voltage pulses.

6. A circuit for regenerating a regulated high voltage signal comprising:

means responsive to a horizontal drive signal for generating a series of flyback voltage pulses;

control means responsive to said horizontal drive signal for generating a corresponding series of regulation voltage pulses each having substantially the same amplitude and pulse width and each occurring in at least partial time coincidence with a respective one of said flyback voltage pulses;

means for combining each of said regulation voltage pulses with the corresponding one of said flyback voltage pulses to produce a combined output signal; and means for generating a reference signal, said control means being responsive to said reference signal and said combined output signal for adjusting the position of each of said regulation voltage pulses relative to the corresponding flyback voltage pulse to regulate the level of said combined output signal.

7. The circuit of claim 6 wherein the leading edge of each of said regulation voltage pulses occurs in time coincidence with a respective one of said flyback voltage pulses.

8. The circuit of claim 6 wherein said control means comprises means for developing an error signal representing the difference between said combined output signal and said reference signal and means for adjusting the position of each of said regulation voltage pulses relative to the corresponding flyback voltage pulse for minimizing said error signal.

9. The circuit of claim 6 wherein said control means comprises means responsive to said horizontal drive signal for initiating the generation of a switching signal at a predetermined time prior to each of said flyback voltage pulses and terminating each of said switching signals during the respective flyback voltage pulse and means responsive to said switching signals for generating said regulation voltage pulses.

10. A regulated high voltage circuit comprising:
    means for generating a horizontal drive signal;
    means including a horizontal deflection coil responsive to said horizontal drive signal for generating a series of flyback voltage pulses;
    control means responsive to said horizontal drive signal for generating a corresponding series of regulation voltage pulses each of which occurs in at least partial time coincidence with a respective one of said flyback voltage pulses;
    flyback transformer means combining each of said regulation voltage pulses with the corresponding one of said flyback voltage pulses for producing a series of combined high voltage output pulses;
    means rectifying said series of combined high voltage output pulses for producing a rectified high voltage output signal; and
    means for generating a reference signal, said control means being responsive to said reference signal and said rectified high voltage output signal for adjusting the position of each of said regulation voltage pulses relative to the corresponding flyback voltage pulse to regulate the level of said rectified high voltage output signal.

11. The circuit of claim 10 wherein each of said voltage regulation pulses comprises a relatively constant energy pulse having substantially the same amplitude and pulse width.

12. The circuit of claim 10 wherein the leading edge of each of said regulation voltage pulses occurs in time coincidence with a respective one of said flyback voltage pulses.

13. The circuit of claim 10 wherein said control means comprises means for developing an error signal representing the difference between said rectified high voltage output signal and said reference signal and means for adjusting the position of each of said regulation voltage pulses relative to the corresponding flyback voltage pulse for minimizing said error signal.

14. The circuit of claim 10 wherein said control means comprises means responsive to said horizontal drive signal for initiating the generation of a switching signal at a predetermined time prior to each of said flyback voltage pulses and terminating each of said switching signals during the respective flyback voltage pulse and means responsive to said switching signals for generating said regulation voltage pulses.

* * * * *